United States Patent [19]

Vedamuthu

[11] Patent Number: 5,445,835
[45] Date of Patent: Aug. 29, 1995

[54] METHOD OF PRODUCING A YOGURT PRODUCT CONTAINING BACTERIOCIN PA-1

[75] Inventor: Ebenezer R. Vedamuthu, Bradenton, Fla.

[73] Assignee: Quest International Flavors & Food Ingredients Company, division of Indopco, Inc., Bridgewater, N.J.

[21] Appl. No.: 192,960

[22] Filed: Feb. 7, 1994

Related U.S. Application Data

[63] Continuation of Ser. No. 898,543, Jun. 15, 1992, abandoned.

[51] Int. Cl.⁶ ............................................. A23C 9/12
[52] U.S. Cl. ............................................. 426/9; 426/42; 426/43; 426/583
[58] Field of Search .................... 426/9, 34, 42, 43, 7, 426/580, 583

[56] References Cited

U.S. PATENT DOCUMENTS

| | | | |
|---|---|---|---|
| 3,420,742 | 1/1969 | Farr . | |
| 4,339,464 | 7/1982 | Vedamuthu | 426/43 |
| 4,790,994 | 12/1988 | Matrozza et al. | 426/38 |
| 4,877,615 | 10/1989 | Vandenbergh et al. | 424/115 |
| 4,883,673 | 11/1989 | Gonzalez et al. | 424/195.1 |
| 4,906,611 | 3/1990 | Vandenbergh et al. | 514/2 |
| 4,929,445 | 5/1990 | Vandenbergh | 424/115 |
| 4,942,032 | 7/1990 | Vandenbergh et al. | 424/115 |
| 4,968,512 | 11/1990 | Kharrazi | 426/40 |
| 5,173,297 | 12/1992 | Vedamuthu et al. | 424/418 |

*Primary Examiner*—Leslie A. Wong
*Attorney, Agent, or Firm*—Ian C. McLeod

[57] ABSTRACT

A method for producing a yogurt product containing a bacteriocin is described. In the preferred method, a milk based medium is cultured with *Pediococcus acidilactici* to produce the bacteriocin, the *Pediococcus acidilactici* is then heat inactivated and finally a yogurt culture is added to the medium with the bacteriocin and cultured to produce the yogurt product. The yogurt product can be dried, either by lyophilization or spray-drying or other means, preferably to a powder, for use in various foods.

12 Claims, No Drawings

METHOD OF PRODUCING A YOGURT PRODUCT CONTAINING BACTERIOCIN PA-1

This is a continuation of application Ser. No. 07/898,543, filed on Jun. 6, 1992, now abandoned.

BACKGROUND OF THE INVENTION (1) Field of the Invention

The present invention relates to a yogurt product with increased shelf life containing a bacteriocin derived from a *Pediococcus acidilactici*. A preferred method for producing the yogurt product is by fermenting a milk based medium with *Pediococcus acidilactici* (PA), heating the medium to terminate growth of the *Pediococcus acidilactici* and fermenting the first fermentate after the heating with a yogurt culture to produce the yogurt product which contains bacteriocin active against undesirable flora.

(2) Prior Art

Yogurt products are well known and are produced by equal parts by cell count of *Lactobacillus bulgaricus* and *Streptococcus thermophilus* and are described, for instance, in U.S. Pat. Nos. 3,420,742 to Farr and 4,339,464 to Vedamuthu.

There are numerous foods which use yogurt as an ingredient in fluid or dried form. Some examples are salad dressings, sauces, baking mixtures, and other food systems requiring a tart, clean, lactic acid flavoring. There are a few dried yogurt powders available in the marketplace.

All the fluid and dried yogurt products currently available are made out of dairy bases which have either been acidified by direct addition of edible acids (primarily lactic acid and $\delta$-gluconolactone for coagulation and acidity) or fermented using a yogurt starter bacteria. The fermented products in addition to dairy ingredients, contain dead, injured and live cells of yogurt bacteria and their metabolic by-products. Those products made by direct acidification will contain the acid(s) used for acidification. Dried yogurt powders can contain any neutralizing agent used to adjust the pH to the desirable range for good or acceptable dehydration of the product.

The usefulness of fluid and rehydrated yogurt products is in providing the specific textural and flavor attributes desired in the food system. Their addition to food systems is not intended to provide a barrier against spoilage or pathogenic bacteria which may gain entry into the food system. Acidity, if present, can provide very limited bacterial inhibition; however, neutralization limits this inhibition. It would be highly desirable to provide bacterial inhibition in the yogurt product.

*Pediococcus acidilactici* is known to produce a bacteriocin which has a broad spectrum against spoilage bacteria. Such bacteriocins are described in U.S. Pat. No. 4,929,445 to Vandenbergh et al; U.S. Pat. No. 5,175,252; U.S. Pat. No. 5,260,212, and U.S. Pat. No. 4,883,673 to Gonzalez et al.

Broad spectrum bacteriocins tend to retard the growth of yogurt cultures. This is true of nisin. Thus nisin has to be blended into the final product, thereby producing a significant risk of contamination of the final product.

It would be desirable if the bacteriocin could be introduced into the milk based medium used to produce the yogurt product. In this manner, the bacteriocin could protect the product as it was produced. The problem is that any acids or the like in excess generated by the bacteriocin producing cultures can inhibit the yogurt cultures.

*Pediococcus acidilactici* is used in meat fermentations. Generally it is not used commercially for milk fermentations because it grows poorly on milk based media. A Pediococcus which grows well in a milk based medium is needed.

OBJECTS

It is therefore an object of the present invention to provide a method whereby the bacteriocin is introduced into the milk based media prior to introducing the yogurt culture. Further, it is an object of the present invention to provide a fermentation step for providing the bacteriocin in the yogurt product. Further still, it is an object of the present invention to provide a *Pediococcus acidilactici* culture which grows well in a milk based medium. Further still, it is an object of the present invention to provide a method for producing a yogurt product which is simple and economical. These and other objects will become increasingly apparent by reference to the following description.

GENERAL DESCRIPTION

The present invention relates to a method for producing a yogurt product which comprises: providing a bacteriocin in a milk based medium by fermenting the medium; and providing yogurt flavors in the fermented medium.

The present invention further relates to a method for producing a yogurt product which comprises: providing a bacteriocin from *Pediococcus acidilactici* in a milk based medium; and fermenting the milk based medium containing the bacteriocin with a yogurt culture to produce the yogurt product containing the bacteriocin, which provides inhibition of undesirable bacterial growth in the yogurt product.

In particular, the present invention relates to a method for producing a yogurt product which comprises: fermenting a milk based medium with a bacteriocin producing *Pediococcus acidilactici* to produce a first fermentate containing the bacteriocin; heating the medium to terminate the growth of the *Pediococcus acidilactici*; and fermenting the first fermentate after the heating with a yogurt culture to produce the yogurt product containing the bacteriocin in an amount which provides inhibition of undesirable bacterial growth in the yogurt product.

Further, the present invention relates to a yogurt product which comprises: a milk based medium containing yogurt flavors; and a bacteriocin produced by a *Pediococcus acidilactici* in the medium in an amount which promotes inhibition of undesirable bacterial growth.

Finally, the present invention relates to a yogurt product which comprises: a milk based medium containing fermentates from fermentation by a yogurt culture; and a bacteriocin produced by a *Pediococcus acidilactici* in an amount which provides inhibition of undesirable bacterial growth. The product can contain live yogurt cultures.

This invention relates to a method which provides fluid or dried yogurt products containing bacteriocins from *Pediococcus acidilactici* as barriers to spoilage and/or pathogenic flora, which are gram-positive. In yogurt, listeria and other low temperature lactobacilli are especially important undesirable bacteria.

A fluid or dried yogurt product is provided containing a biologically derived *Pediococcus acidilactici* bacteriocin active against spoilage and/or pathogenic flora, preferably developed in situ in a milk based medium by using a single-stage or two-stage fermentation. The microorganisms used in developing the yogurt product are cultures traditionally used in such fermentations.

The preferred strain is *Pediococcus acidilactici* NRRL-B-18925. This strain has been deposited under the Budapest Treaty with the Northern Regional Research Laboratory (NRRL) in Peoria, Ill. This strain is particularly effective in producing the bacteriocin in a milk based medium. There are numerous other *Pediococcus acidilactici* strains which are available from the American Type Culture Collection or the NRRL which can be grown in milk to produce strains which effectively grow in milk based media.

Preferably the milk based medium is fermented between 25° and 45° C. to produce the bacteriocin. The medium includes non-fat milk solids, a carbohydrate source and milk hydrolyzates which provide proteins and amino acids for growth of the *Pediococcus acidilactici* (PA). The milk solids are not actively metabolized by the *Pediococcus acidilactici* (PA) and are impregnated with the bacteriocin. The milk solids are preferably present in an amount between 0.1 and no more than 5.0% by weight in the milk based medium to avoid precipitation on further processing. The fermented medium after production of the bacteriocin is neutralized to a pH between about 5.2 and 6.3 to provide a suitable medium for the yogurt culture. The medium is heated to about 65° to 80° C. to terminate growth of the *Pediococcus acidilactici*.

Generally the heat treated *Pediococcus acidilactici* fermented medium is fortified with nonfat milk solids in an amount between about 5 and 15 percent depending upon the amount in the milk based medium used for the *Pediococcus acidilactici* fermentation. The fortified medium is then fermented with the yogurt culture to produce the yogurt product. Preferably, this second stage fermentation is at about 35° to 43° C.

The yogurt product can also be produced by direct acidulation. This method is not preferred.

The yogurt product is preferably dried to a powder to make it easier to ship for use as an additive to salad dressings and the like. Preferably spray drying at about 87° to 102° C. is used since a powder is produced directly. The product may also be lyophilized.

The product contains 100 to 10,000 AU per gram of the bacteriocin. The unit "AU" is defined as 5 microliters of the highest dilution of the yogurt product yielding a zone of growth inhibition with a lawn of a gram positive bacteria (*Pediococcus pentosaceus* FBB-63) on an agar plate.

SPECIFIC DESCRIPTION

EXAMPLE 1

This example describes a two-stage fermentation using a bacteriocin producing strain and a yogurt culture. The first-stage fermentation involved the use of a strain of *Pediococcus acidilactici* which produced the bacteriocin PA-1 in situ in a milk based medium. Using the same medium, a second-stage fermentation using a yogurt starter culture was performed to obtain yogurt containing the bacteriocin. The yogurt was lyophilized as such, or after pH was adjusted to 5.5. The yogurt product had the typical tartness and "green" flavor associated with yogurt along with live yogurt bacteria and the bacteriocin. Most importantly and unexpectedly, the liquid and the dried yogurt products had an equivalent or only slightly lower titer of the bacteriocin PA-1 found immediately after the initial fermentation by the *Pediococcus acidilactici*. Thus, one of the technological problems that had to be overcome related to the prevention of extreme precipitation and wheying off experienced when the original milk medium was heat-treated to destroy the pediococci such that the second fermentation could proceed unhindered.

The first step was to obtain a strain of *Pediococcus acidilactici* that would produce bacteriocin PA-1 in milk. Strain PAC 10.0 (*Pediococcus acidilactici* NRRL-B-18925) produced the maximum titer of bacteriocin (pediocin) in milk fortified with 0.5% yeast extract and 1.0% glucose by volume. Because yeast extract does not qualify as a milk derived ingredient, milk fortified with various milk-derived hydrolysates was used. Of the various milk protein hydrolysates tested, EDAMIN K at 1.0% by volume level gave the maximum titer of bacteriocin when PAC 10.0 was used. EDAMIN K is a hydrolysate of whey proteins made by Sheffield Products, Norwich, N.Y. Strain PAC 10.0 produced between 800 and 1600 AU/ml of bacteriocin when cultured in reconstituted 11% nonfat milk solids fortified with 1.0% glucose and 1.0% EDAMIN K, all reconstituted weight per volume. Lower levels of the whey protein derivative did not give equivalent titer of bacteriocin. Higher levels failed to boost the bacteriocin titer. Milk fortified at 1.0% by weight per volume each of glucose and EDAMIN K was selected for use.

When the milk system cultured for pediocin production was heat-treated for the second-stage yogurt fermentation, excessive precipitation of the acid-denatured milk protein occurred. The system was thus unsuitable for yogurt fermentation. Adjustment of the pH of the cultured bacteriocin-containing mix before heat-treatment also failed to alleviate the precipitation problem. It was found that the bacteriocin titer remained unchanged even when the nonfat solids level in the mix was dropped to 1.0% from 11% (weight per volume) which was unexpected. When strain PAC 10.0 was initially cultured in a menstruum made up of a mix containing 1.0% each of nonfat milk solids, glucose and EDAMIN K, and subsequently adjusted to pH 6.3 followed by fortification with 11 to 12% nonfat milk solids (weight per volume) and was heat-treated at 65°–80° C. for 60 minutes with either intermittent or constant agitation, there was very little or no precipitation and the bacteriocin remained active. The resulting mix was suitable for yogurt fermentation. The mix, after reducing the temperature, was inoculated with 1.0% by volume yogurt starter (FARGO® 404 available from Quest International, Inc., 1833 57th Street, P. 0. Box 3917, Sarasota, Fla. 34230) and incubated at 35° C. for 16 to 18 hours. At the end of incubation, the yogurt product was cooled, and analyzed for pH, bacteriocin titer, and organoleptic quality. The major advantage achieved in performing a two-stage fermentation in the same menstruum was that no dilution of bacteriocin titer occurred. If the two fermentations were to be separately done and then mixed together to obtain yogurt containing pediocin, there would be a dilution of bacteriocin titer. Also, the two-stage method allowed the development of a unique procedure for application in milk fermentations to produce a yogurt product.

Table 1 shows the bacteriocin level at various stages of the fermentation. The yogurt product had an acceptable level of bacteriocin for inhibiting undesirable bacteria.

TABLE 1

Titer of pediocin PA-1 at various stages in two-stage fermentation for the production of yogurt powder containing pediocin PA-1[a][b]

| | | |
|---|---|---|
| (1) | Titer at the end of first fermentation | 800 AU/ml |
| (2) | Titer after pH adjustment to 5.4–5.5 followed by fortification with 11% nonfat milk solids and heat treatment at 65° C. for 60 min. | 800 AU/ml |
| (3) | Titer in the yogurt before (pH 3.8) and after pH adjustment to 5.5 | 800 AU/ml |
| (4) | Titer in lyophilized yogurt (pH 5.5) | 8000 AU/g |

[a]The first fermentation was carried out in a mix made up of 1.0% non-fat milk solids, 1.0% EDAMIN K, and 1.0% glucose (weight per volume). The mix was heat-treated at 121° C. for 5 minutes. Strain PAC 10.0 was inoculated at 1.0% (v/v), and the inoculated mix was incubated for 16 hours at 35° C.. This provides about $10^6$–$10^7$ cells per ml of the first stage fermentation mixture.
[b]Yogurt culture was added at 1.0% (v/v) ($10^5$ cells/ml) and the inoculated mix was incubated at 35° C. for 16 hours. Adjustment of yogurt pH to 5.5 allowed spray-drying of the product to a powder. This was accomplished at 60–80° C..

EXAMPLE 2

In this Example, the bacteriocin as a purified chemical was added to the milk based medium prior to adding the yogurt culture. The bacteriocin was added to a level of 800 AU/ml. The second stage fermentation was then performed as in Example 1. The resultant fermentate retained the original titer.

EXAMPLE 3

The application of bacteriocin-containing yogurt powder was tested in a frozen yogurt system. A total volume of 300 ml mix for frozen yogurt was made. An unfermented base mix was made separately and combined with sufficient amount of fully fermented yogurt mix such that the final acidity of the combined mix was 0.3% as lactic acid. The proportions worked out to be a mixture of 255 parts of the base mix and 45 parts of fully fermented yogurt.

| Composition of the base mix: | |
|---|---|
| 40% Cream | 25 parts |
| Whole Milk | 201 parts |
| Non-fat dry Milk | 12 parts |
| Sugar | 45 parts |
| 80% Corn Sweetener | 24 parts |
| Stabilizer-Emulsifier | 2 parts |
| Composition of yogurt mix: | |
| Skim milk 0.2% milk fat | 97 parts |
| Non-fat dry milk | 3 parts |

The two mixes were separately heat treated at 100° C. for 5 minutes. The yogurt mix was cultured with a yogurt starter at 35° C. overnight. The base mix was stored at 5° C. The following morning, the final mix was made by combining the required proportions of the base mix (255 parts) and the yogurt (45 parts). After uniform mixing of the two components, the mix was divided into 100 ml portions into 3 separate sterile screw-cap Erlenmeyer flasks. They were labeled 1, 2 and 3. To flask 1, two grams of non-fat milk powder was added and mixed in. To flask 2, two grams of previously made bacteriocin-containing yogurt powder of Example 1 was added and mixed in. The yogurt powder contained 4000 AU/gm. Hence, the contents of flask 2, had an equivalent of 80 AU/ml of the bacteriocin. To flask 3, two grams of nonfat milk powder was added. The three flasks were placed in a boiling water-bath for 10 minutes, and cooled in a bath of tap water. When the flasks cooled down to room temperature, flask 3 was isolated from the other two. To flasks 1 and 2, a suitable dilution ($1 \times 10^{-3}$) of an overnight culture of Listeria monocytogenes LM04 was added to provide approximately $1 \times 10^4$ cells of the pathogen per ml of the mix. The three flasks were emptied into three separate previously labeled wide-mouth plastic containers. The containers were closed with suitable lids and placed in a $-20°$ C. freezer.

After 4 days and 15 days, each container was removed and a sufficient portion of the frozen material chipped out into three separate sterile snap-cap plastic tubes. The containers were returned to the freezer after sampling. The samples were thawed in a 37° C. waterbath and immediately after thawing were plated on "OXOID" Listeria Selective Agar (Unipath Ltd., Basingstoke, Hampshire, England). On this agar, Listeria form dark grey or black colonies with dark grey or black zones. Other flora are inhibited on this medium. Suitable sample portions or dilutions were spread-plated to get accurate counts.

TABLE 2

| Sample | Listeria (CFU/ml) | Time (Days) |
|---|---|---|
| Culture for inoculum | $1.2 \times 10^9$ | 0 |
| Count in the mix Flask 1 | $1.3 \times 10^4$ | 0 |
| Count on frozen mix Flask 1 | $0.9 \times 10^4$ | 4 |
| Count on frozen mix Flask $2^a$ | 1.0 | 4 |
| Count on frozen mix Flask $3^b$ -uninoculated control | <1 | 4 |
| Count on frozen mix Flask 1 | $0.7 \times 10^4$ | 15 |
| Count on frozen mix Flask $2^b$ | <1 | 15 |
| Count on frozen mix Flask $3^b$ | <1 | 15 |

[a]0.1 ml aliquots of the thawed material was spread on ten separate plates. One colony was found on one of the ten plates.
[b]No colonies were found in any of the ten plates spread with 0.1 ml of the thawed material.

Addition of yogurt powder containing the bacteriocin so as to give 80 AU/ml of the frozen yogurt mix reduced the population of added listeria from $1.2 \times 10^4$/ml to 1.0/ml within 4 days of freezing. After 15 days, none could be found in the mix containing the yogurt powder. The inoculated control maintained the numbers of added listeria throughout the storage.

It is intended that the foregoing specification be only illustrative of the present invention and that the present invention be limited to the hereinafter appended claims.

I claim:

1. A method for producing a yogurt product which comprises:
   (a) fermenting a milk based medium by growth of a bacteriocin producing *Pediococcus acidilactici* to produce a first fermentate containing the bacteriocin wherein the milk based medium contains between about 0.1 and 5 percent by weight of milk solids;
   (b) adding milk powder to the first fermentate; and
   (c) heating the milk based medium with the added milk powder to terminate the growth of the *Pediococcus acidilactici;*
   (d) fermenting the first fermentate containing the added milk powder after the heating with a yogurt culture containing *Lactobacillus bulgaricus* and *Streptococcus theremophilus* to produce the yogurt product containing the bacteriocin in an amount which provides inhibition of undesirable bacterial growth in the yogurt product.

2. The method claim 1 wherein the *Periococcus acidilactici* is deposited as NRRL-B-18925.

3. The method of claim 1 wherein the fermentation in step (a) is at a temperature between about 25° and 45° C.

4. The method of claim 1 wherein the fermentation in step (d) is at a temperature between about 35° and 43° C.

5. The method of claim 2 wherein the milk powder is a non-fat dry milk powder.

6. The method of claim 1 wherein a yogurt acidity is imparted to the yogurt product by lactic acid and delta-gluconolactone.

7. The method of claim 1 wherein the fermentation in step (a) is at a temperature of 25° to 45° C. and in step (d) at 35° to 43° C.

8. The method of claim 7 wherein the *Pediococcus acidilactici* is deposited as NRRL-B-18925.

9. The method of claim 1 wherein the product is dried to a powder.

10. The method of claim 9 wherein the product is dried at a temperature of up to about 87° to 102° C.

11. The method of claim 10 wherein the product is dried by spray drying.

12. The method of claim 10 wherein the product is dried by lyophilizing.

* * * * *

UNITED STATES PATENT AND TRADEMARK OFFICE
CERTIFICATE OF CORRECTION

PATENT NO. : 5,445,835
DATED : August 29, 1995
INVENTOR(S) : Ebenezer R. Vedamuthu It is certified that error appears in the above-indentified patent and that said Letters Patent is hereby corrected as shown below:

Column 6, line 36 (Table 2), "$^a$10.1 ml" should read --$^a$0.1 ml--.

Column 7, line 3 (Claim 2), after "method", --of-- should be inserted.

Column 7, line 10 (Claim 5), "Claim 2" should read --Claim 1--.

Signed and Sealed this

Ninth Day of January, 1996

Attest:

BRUCE LEHMAN

Attesting Officer     Commissioner of Patents and Trademarks